(12) United States Patent
Tingley et al.

(10) Patent No.: US 12,409,577 B1
(45) Date of Patent: Sep. 9, 2025

(54) CUTTING TOOL ASSEMBLY FOR USE IN CONTROLLED FRACTURE MACHINING

(71) Applicant: Tennine Corp., Grand Rapids, MI (US)

(72) Inventors: William Q Tingley, Grand Rapids, MI (US); Daniel R. Bradley, Grand Rapids, MI (US); Stephen C. Parrow, Grandville, MI (US)

(73) Assignee: Tennine Corp., Grand Rapids, MI (US)

( * ) Notice: Subject to any disclaimer, the term of this patent is extended or adjusted under 35 U.S.C. 154(b) by 0 days.

(21) Appl. No.: 18/599,978

(22) Filed: Mar. 8, 2024

(51) Int. Cl.
  *B23D 13/00* (2006.01)
  *B23B 29/04* (2006.01)
  *B26F 3/00* (2006.01)

(52) U.S. Cl.
  CPC ............ *B26F 3/002* (2013.01); *B23B 29/043* (2013.01); *B23D 13/005* (2013.01)

(58) Field of Classification Search
  CPC ..... B26F 3/002; B23B 29/043; B23D 13/005; B23D 13/00
  See application file for complete search history.

(56) References Cited

U.S. PATENT DOCUMENTS

| | | | | |
|---|---|---|---|---|
| 15,379 A | * | 7/1856 | Mason | B23D 13/005 411/924 |
| 61,420 A | * | 1/1867 | Hall | B23D 13/005 409/346 |
| 135,182 A | * | 1/1873 | Walkington | B23D 13/005 409/346 |
| 154,540 A | * | 9/1874 | Carr et al. | B23D 13/005 409/346 |
| 167,793 A | * | 9/1875 | Smith et al. | B23D 13/005 409/346 |
| 267,147 A | * | 11/1882 | Byrne | B23D 13/005 409/346 |
| 298,267 A | * | 5/1884 | Angus | B23D 13/005 409/346 |
| 298,268 A | * | 5/1884 | Angus | B23D 13/005 409/346 |
| 298,269 A | * | 5/1884 | Angus | B23D 13/005 409/346 |
| 318,646 A | * | 5/1885 | Neild | B23D 13/005 409/346 |
| 339,212 A | * | 4/1886 | Reinhardt | B23D 13/005 409/346 |

(Continued)

FOREIGN PATENT DOCUMENTS

| | | | | |
|---|---|---|---|---|
| JP | 2013056414 A | * | 3/2013 | ........... B23D 13/005 |
| WO | WO-2010098306 A1 | * | 9/2010 | ........... B23D 13/005 |

*Primary Examiner* — Sara Addisu
(74) *Attorney, Agent, or Firm* — Frank M. Scutch, III

(57) ABSTRACT

A cutting tool assembly for use in controlled fracture machining includes a body having a rectilinear shape with a top end and bottom end and a tool holder attached to the bottom end of the body. A first cutting tool is configured at one lower end of the tool holder is to operate the tool in a forward direction of movement while a second cutting tool is configured at the opposite end of the tool holder to operate in a reverse direction of movement. The tool is shaped so an upper portion of the tool holder has a first diameter and the lower portion of the tool holder has a second diameter. The first diameter can smaller or larger than the second diameter depending on the size and type of workpiece and shape needed to produced.

6 Claims, 3 Drawing Sheets

(56) References Cited

U.S. PATENT DOCUMENTS

| | | | | |
|---|---|---|---|---|
| 471,189 A * | 3/1892 | Parsons et al. | ...... | B23D 13/005 409/346 |
| 575,703 A * | 1/1897 | Costello | ...... | B23D 13/005 409/346 |
| 584,233 A * | 6/1897 | McIndoe | ...... | B23D 13/005 409/346 |
| 617,008 A * | 1/1899 | Dahl | ...... | B23D 13/005 409/346 |
| 627,099 A * | 6/1899 | Clugston | ...... | B23D 13/005 409/319 |
| 708,947 A * | 9/1902 | Wicksteed | ...... | B23D 13/005 409/346 |
| 731,388 A * | 6/1903 | Ryden | ...... | B23D 13/005 409/346 |
| 780,451 A * | 1/1905 | Strehlau | ...... | B23D 13/005 409/346 |
| 843,244 A * | 2/1907 | Warner | ...... | B23D 13/005 409/346 |
| 848,320 A * | 3/1907 | Pierce | ...... | B23D 13/005 409/346 |
| 873,089 A * | 12/1907 | Riddell | ...... | B23D 13/005 29/23.51 |
| 994,965 A * | 6/1911 | Winkler | ...... | B23D 13/005 409/346 |
| 1,009,005 A * | 11/1911 | Winkler | ...... | B23D 13/005 409/346 |
| 1,017,112 A * | 2/1912 | Seitz | ...... | B23D 13/005 409/346 |
| 1,041,984 A * | 10/1912 | Eggers | ...... | B23D 13/005 409/346 |
| 1,074,041 A * | 9/1913 | Bilby | ...... | B23D 13/005 409/346 |
| 1,135,157 A * | 4/1915 | Clarke | ...... | B23D 13/005 409/346 |
| 1,223,493 A * | 4/1917 | Johnson | ...... | B23D 13/005 409/346 |
| 1,244,302 A * | 10/1917 | Dunsford | ...... | B23D 13/005 409/346 |
| 1,319,250 A * | 10/1919 | Sarlandt | ...... | B23D 13/005 409/346 |
| 1,326,254 A * | 12/1919 | Cote | ...... | B23D 13/005 409/346 |
| 1,341,206 A * | 5/1920 | Cronau | ...... | B23D 13/005 409/346 |
| 1,445,579 A * | 2/1923 | Ericksen | ...... | B23D 13/005 409/346 |
| 1,460,681 A * | 7/1923 | Sarlandt | ...... | B23D 13/005 409/346 |
| 1,907,632 A * | 5/1933 | Weber | ...... | B23D 13/005 409/346 |
| 2,015,919 A * | 10/1935 | Brunner | ...... | B23D 1/18 409/346 |
| 2,352,132 A * | 6/1944 | Southwell | ...... | B23D 13/005 125/30.01 |
| 2,358,897 A * | 9/1944 | Walter | ...... | B23D 13/005 409/346 |
| 2,369,361 A * | 2/1945 | Marx | ...... | B23D 13/005 409/346 |
| 2,398,791 A * | 4/1946 | Jackson | ...... | B23D 13/005 409/346 |
| 2,466,197 A * | 4/1949 | Berthiez | ...... | B23D 13/005 407/101 |
| 2,475,577 A * | 7/1949 | Berthiez | ...... | B23D 13/005 409/346 |
| 2,624,099 A * | 1/1953 | Berthiez | ...... | B23D 13/005 409/900.2 |
| 3,040,632 A * | 6/1962 | Walter | ...... | B23D 13/005 407/89 |
| 3,136,219 A * | 6/1964 | Hino | ...... | B23D 13/005 409/346 |
| 3,146,677 A * | 9/1964 | Kochar | ...... | B23D 13/005 409/331 |
| 3,163,088 A * | 12/1964 | Lange | ...... | B23D 13/005 409/346 |
| 8,327,742 B1 * | 12/2012 | Austin | ...... | B23C 5/2472 82/1.11 |
| 8,821,086 B2 * | 9/2014 | Tingley, III | ...... | B23C 3/00 409/289 |
| 9,101,991 B1 * | 8/2015 | Tingley, III | ...... | B23D 13/00 |
| 10,112,240 B2 * | 10/2018 | Li | ...... | B23C 3/12 |
| 10,350,777 B2 * | 7/2019 | Kim | ...... | B26D 1/285 |
| 2014/0341661 A1 * | 11/2014 | Lin | ...... | B23C 3/12 407/53 |

* cited by examiner

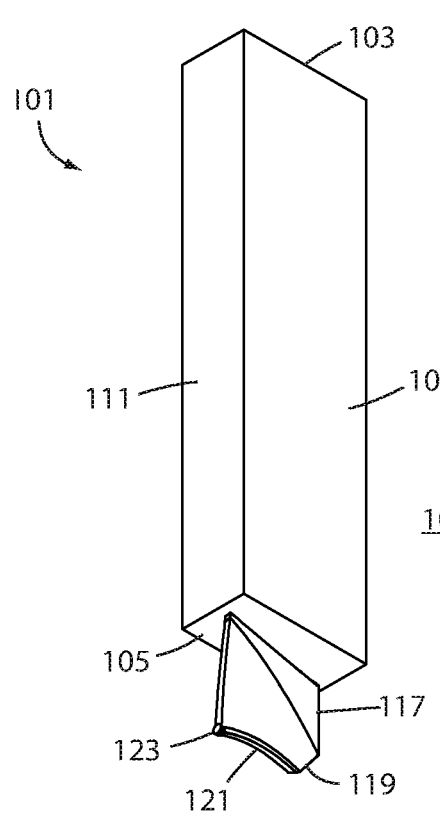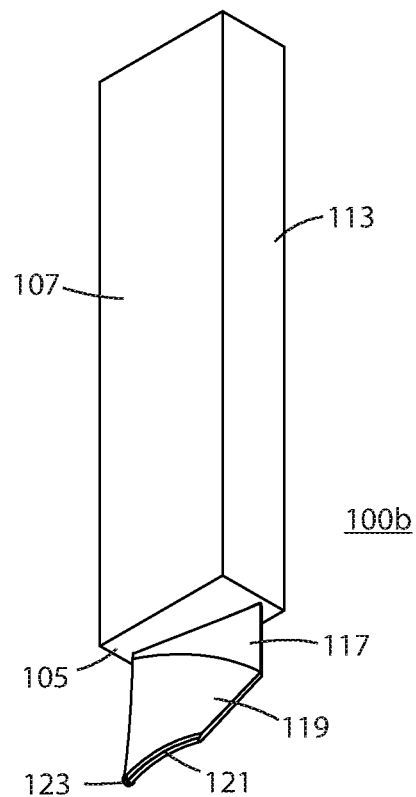
FIG. 1A  FIG. 1B
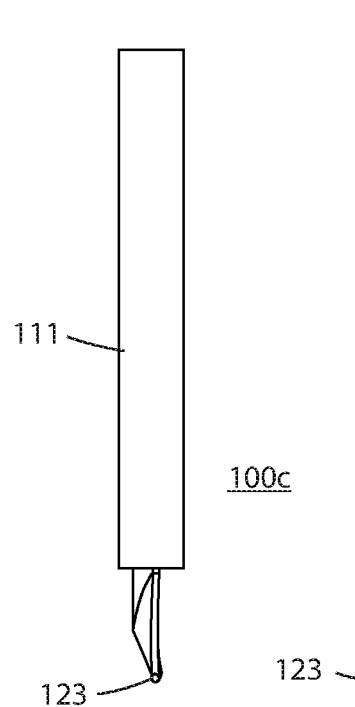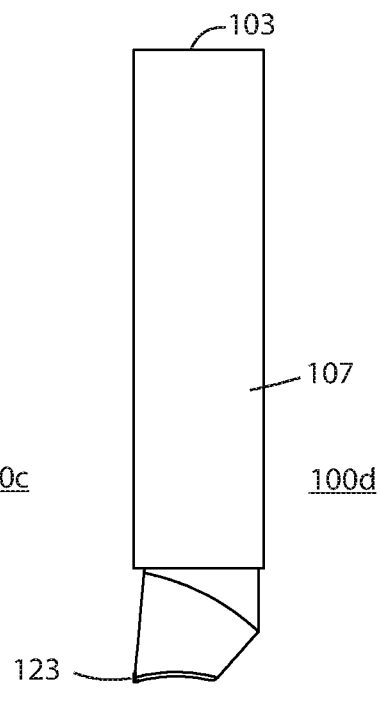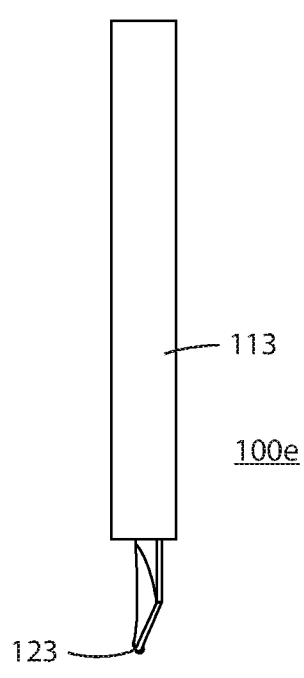
FIG. 1C  FIG. 1D  FIG. 1E 300a 300b 300c 300d 300e

CUTTING TOOL ASSEMBLY FOR USE IN CONTROLLED FRACTURE MACHINING

FIELD OF THE INVENTION

The present invention relates generally to machining processes and more particularly to an angled blisk tool assembly for use in controlled fracture machining.

BACKGROUND

Hyper-feed machining is an entirely new method of producing miniatured parts for example a turbine blade used in gas turbine engines. More information regarding the process of controlled fracture is fully described in Applicant's U.S. Pat. No. 8,821,086 entitled Method and Apparatus for Controlled-Fracture Machining, U.S. Pat. No. 9,101,991 entitled Method and Apparatus for Non-Spindle Multi-Axis Machining and U.S. Patent Application Publication 2021/0402529 each assigned to Tennine Corp. and all incorporated by reference herein in their entireties.

Manufacturing the bladed components of gas turbine engines by hyper-feed machining is orders of magnitude greater in volumetric removal rates over as compared to other methods of manufacture. Material removal using controlled fracturing is more precise and more accurate. Controlled fracture machining can produce components, e.g. those with blades, that are more geometrically complex, more highly curved, and thinner in cross-section. Most significantly, these processes can produce machine bladed components that are much smaller in scale than current turbomachines of all kinds. This makes possible and practical the production of gas turbine engines for a new world of applications replacing all manner of more complex, high-emission, and more expensive engines for propulsion and power generation, in particular electric battery and piston engines.

By applying hyper-feed machining to the manufacture of gas turbine engines, two fundamentally significant advances in their production are made possible and practical. The first advance is the full scalability of this method in the manufacture of the bladed components of gas turbine engines. With hyper-feed machining, these small-scale gas turbine engines are both high performance and as efficient as their larger scale counterparts. New applications include: (1) turbo-electric vehicles, replacing both electric battery vehicles and piston engine vehicles; (2) turboshaft electric helicopters and VSTOL aircraft; (3) small turbo-electric aircraft, drones, and marine vessels; (4) military vehicles with attritable engines; (5) household turbo-electric power generators; and many other new uses.

Computer numerical-controlled (CNC) rotary milling of gas turbine engine blisks is the most common current method. A ball-nose end mill is typically the cutting tool used. In this process, the ball-nose must spin on its axis to produce sufficient torque to cut away material from the workpiece to an approximation of the net shape. By its nature this imposes axial symmetry upon the ball-nose as a cutting tool. This significantly restricts the shapes that a ball-nose can cut into a workpiece to manufacture a blisk, especially its blades. The ball-nose's axial symmetry also frequently creates interference problems with the compound curves of the blades, which results in the ball-nose cutting away previously machined portions of the blades to reach deeper surfaces that need to be machined; therefore, not capable of cutting those surfaces at all.

Furthermore, milling by rotating a cutting tool requires fluting the ball-nose with a plurality of cutting edges. When the ball-nose is spun to produce torque as the force to remove material from the workpiece to approximate net shape, these flutes rotate in and out of the workpiece. Thus, the cut is not continuous but interrupted. This significantly restricts the performance of the ball-nose, especially in terms of the rate of volumetric material removal from the workpiece to produce a blisk. Moreover, this discontinuous plastic deformation of the workpiece imparts heat to it which makes the milling of thin cross-sections imprecise or prone to fracture from embrittlement.

Thus, new processes and tools are need to enhance controlled fracture machining processes.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 1A, 1B, 1C, 1D and 1E are right side perspective view, left side perspective view, front side view, left side view, and rear side view of a cutting tools used in controlled fracture machine according to a first embodiment of the invention;

Figure 2A:
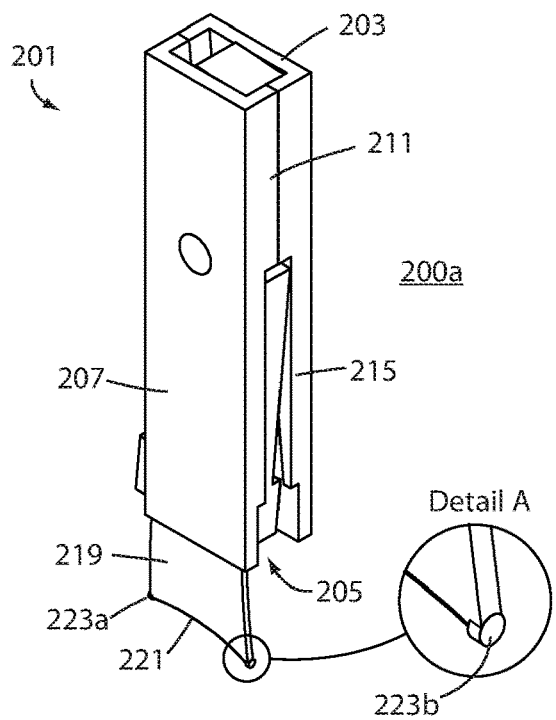
FIGS. 2A, 2B, 2C, 2D and 2E are right side perspective view, left side perspective view, front side view, left side view, and rear side view of a cutting tools used in controlled fracture machine according to a second embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a cutting tool assembly for use in controlled fracture machining. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. Further, it is expected that one of ordinary skill, notwithstanding possibly significant effort and many design choices motivated by, for example, available time, current technology, and economic considerations, when guided by the concepts and principles disclosed herein will be readily capable making the invention with minimal experimentation.

Controlled fracture machining or "controlled fracturing" is a process for removing workpiece material that occurs by applying an impact force that simultaneously exceeds the yield strength and the breaking strength of the workpiece material so to prevent plastic deformation. A controlled fracture is produced by an impact of a cutting tool which causes an axial projection of banding along the perimeter of the tool to produce a repeatable, precise removal of workpiece material. Thus, the cutting tool and its configuration are critical to the controlled fracturing process.

FIGS. 1A, 1B, 1C, 1D and 1E are right side perspective view, left side perspective view, front side view, left side view, and rear side view of a cutting tools used in controlled fracture machine according to a first embodiment of the invention. With regard to each of FIGS. 1A to 1E, the angled blisk tool 100a, 100b, 100c, 100d, 100e for use in controlled fracture machining includes a tool body 101 that is typically rectilinear in shape. The tool body 101 includes a top 103 and bottom 105 and right side 107 and left side 109 as well as a front side 111 and rear side 113.

A cutting tool holder 115 is attached and/or fastened to the bottom 105 of the body 101 using a attachment wedge 117. The holder further is shaped to include a slanted edge 119 and angled edge 121 that connects to cutting tool 123. The cutting tool 123 is used in hyper-feed machining processes and works to produce a desired net material removal rate by inducing an abrupt, highly localized, and substantially extreme force of a cutting tool 123 against a workpiece. This force must be sufficient to exceed the ultimate shear strength of the material of the workpiece. When the force is applied, adiabatic shear bands form in the workpiece as a microstructure of micro-cracks emanating in the direction normal to the face of the cutting tool 123 along the outside contour of the cutting tool as projected into a workpiece.

Under the continued linear force of the cutting tool 123 moving through the workpiece, this microstructure softens relative to the uncut material surrounding it, because the cracked material becomes highly fractured, even to the point of recrystallizing. Once the material is softened, the cutting tool 121 shears the material from the workpiece as waste which retains almost all of the heat generated by the process, because its microstructure of cracks retards the transfer of heat to material outside of the microstructure. The end result of the controlled-fracturing process, results in a desired net shape of the workpiece, without the distortions and warping of heat generated by machining, using cutting tools with contours in accord with the complex surface geometries.

Figure 2B:
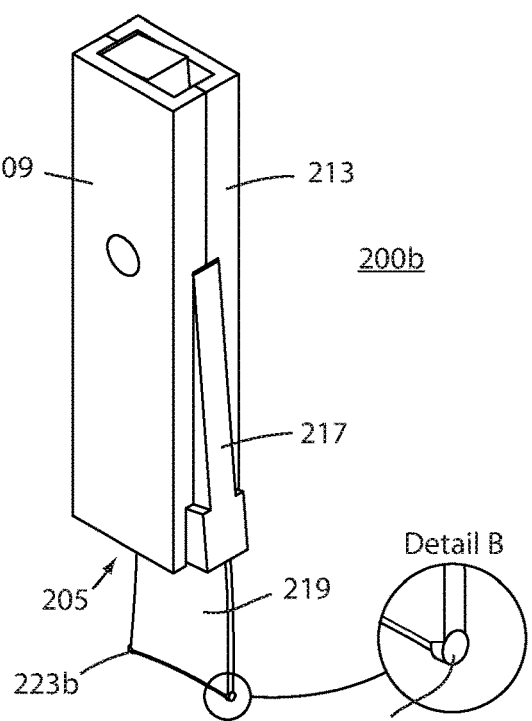
Figure 2C:
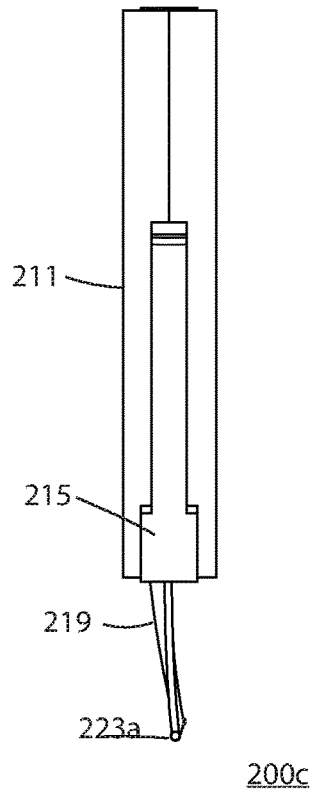

FIGS. 2A, 2B, 2C, 2D and 2E are right side perspective view, left side perspective view, front side view, left side view, and rear side view of a cutting tools used in controlled fracture machine according to a second embodiment of the invention. With regard to each of FIGS. 1A to 1E, the angled blisk tool 200a, 200b, 200c, 200d, 200e for use in controlled fracture machining includes a tool body 201 that is typically rectilinear in shape. The tool body 201 includes a top 203 and bottom 205 and right side 207 and left side 209 as well as a front side 211 and rear side 213. The front side 211 includes a recess 215 while the rear side includes clip 217. As seen in FIG. 2B, the recess 215 and clip 217 are used in connection with the controlled fracture machine so the tool holder 219 can be move and adjust to a desired cutting angle.

Figure 2D:
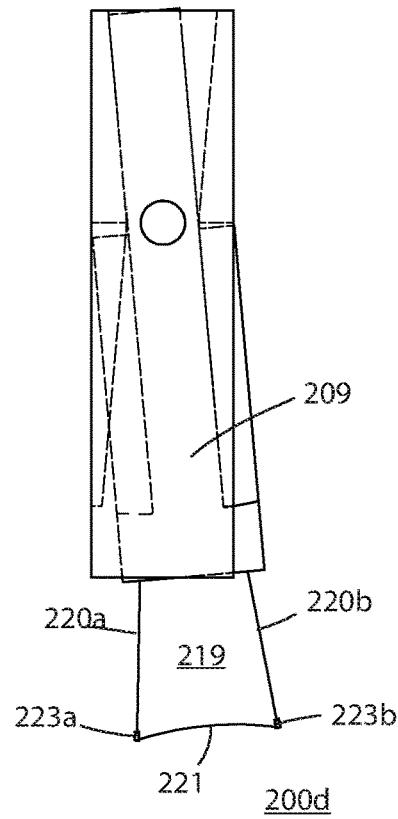
Figure 2E:
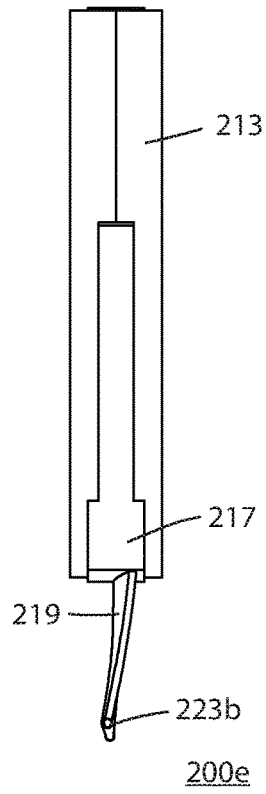

The angled blisk tool 200a, 200b, 200c, 200d, 200e shown in this second embodiment has a different shaped tool holder 219. More specifically, the tool holder 219 includes angled slides 220a, 220b that extend outwardly to edge 221. Edge 221 is wider in diameter than the upper end of the tool holder 219 so the tool holder 219 forms a trapezoidal-like shape. At the ends of the edge 221, a first cutting tool 223a and second cutting tool 223b work to strike a workpiece and remove material during the controlled fracture process. As seen in the magnified detail views of FIG. 2A and FIG. 2B, the cutting tool 223a, 223b is configured as a circular cutting surface, however those skilled in the art will recognize that other shapes are possible such as rectangular, triangular or the like. In use, the first cutting tool 223a can be used in a forward direct while the second cutting tool 223b can be used in a reverse direction. As best seen in FIG. 2D, the tool holder 219 is able to move laterally so it can be set to a desired cutting angle for both cutting tool 223a, 223b.

Figure 3A:
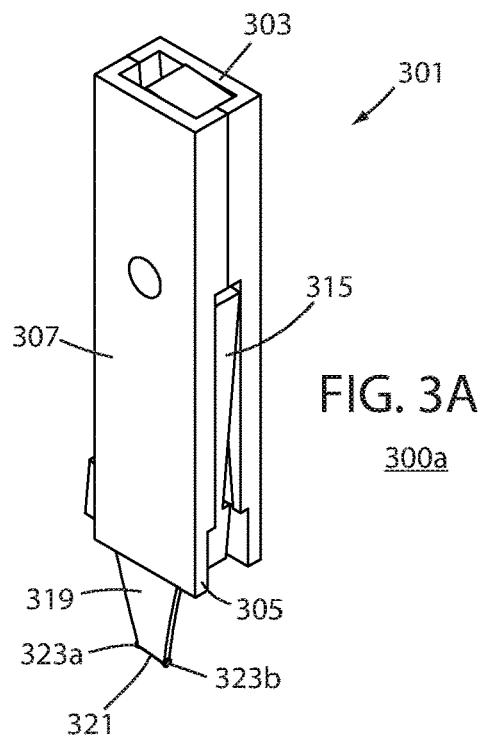
FIGS. 3A, 3B, 3C, 3D and 3E are right side perspective view, left side perspective view, front side view, left side view, and rear side view of a cutting tools used in controlled fracture machine according to a third embodiment of the invention.
Figure 3B:
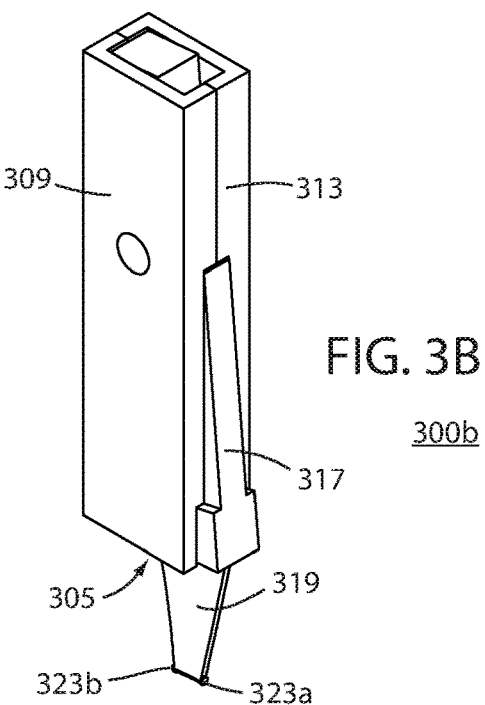
Figure 3C:
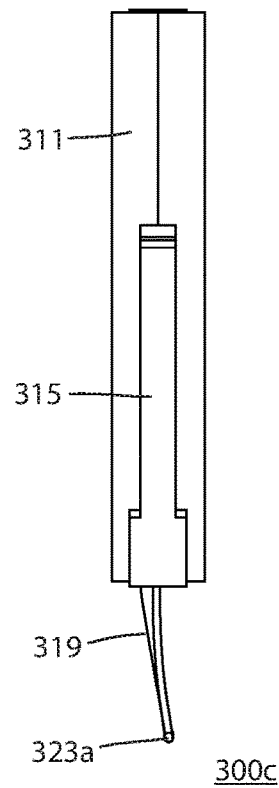

FIGS. 3A, 3B, 3C, 3D and 3E are right side perspective view, left side perspective view, front side view, left side view, and rear side view of a cutting tools used in controlled fracture machine according to a third embodiment of the invention. With regard to each of FIGS. 3A to 3E, the angled blisk tool 300a, 300b, 300c, 300d, 300e for use in controlled fracture machining includes a tool body 301 that is typically rectilinear in shape. The tool body 301 includes a top 303 and bottom 305 and right side 307 and left side 309 as well as a front side 311 and rear side 313. The front side 311 includes a recess 315 while the rear side includes clip 317. As seen in FIG. 3B, the recess 315 and clip 317 are used in connection with the controlled fracture machine so the tool holder 319 can be move and/or adjust to a desired cutting angle.

Figure 3D:
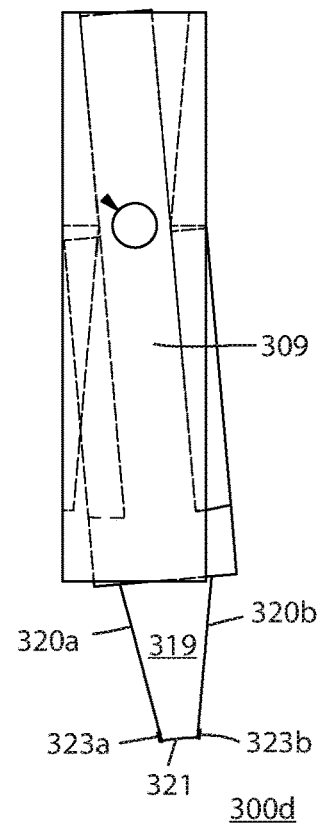
Figure 3E:
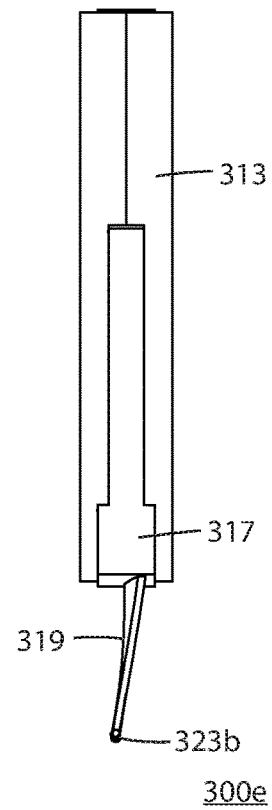

The angled blisk tool 300a, 300b, 300c, 300d, 300e shown in this third embodiment has a different shaped tool holder 219 that is narrower than that shown in FIGS. 2A-2E. As seen in FIGS. 3A to 3E, the tool holder 319 includes angled slides 320a, 320b that extend outwardly to edge 321. Contrary to that shown in FIGS. 2A to 2E, edge 221 is shorter in diameter than the upper end of the tool holder 319 so the tool holder 319 forms a trapezoidal-like shape. At the ends of the edge 321, a first cutting tool 323a and second cutting tool 323b work to strike a workpiece and remove material during the controlled fracture process. As noted above, the first cutting tool 323a can be used in a forward direction while the second cutting tool 323b can be used in a reverse direction. As best seen in FIG. 3D, the tool holder 319 is able to move laterally so it can be set to a desired cutting angle for both cutting tool 223a, 223b.

Embodiments of the present invention are directed to a cutting tool assembly for use in controlled fracture machining where the tool assembly include a body and a tool holder attached to one end of the body such that a slanted edge is formed connecting an angled edge and where at least one cutting tool is configured on at least one side of the angled edge. In one embodiment an attachment wedge is connected between the body and slanted edge. Further the tool assembly may include one or two cutting tools where two cutting tools are configured such that one tool operates in a forward direction of movement and a second cutting tool operates in a reverse or opposite direction of movement. Moreover, the tool can be shaped so that upper portion of the tool holder is narrower or wider in diameter than the bottom portion of the tool holder allowing for the tool to be configured depending on the type and shape of the workpiece and the desired shapes to be cut. The body of the tool assembly has a rectilinear shape allowing tie to be held and mounted within a controlled fracture machine.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A cutting tool assembly for use in controlled fracture machining comprising:
    a body having a rectilinear shape with a top end and bottom end;
    a tool holder attached to the bottom end of the body where the tool holder includes at least one slanted edge connecting the body with an angled edge, and where the at least one angled edge extends below the at least one slanted edge so that the angled edge forms a curved shape; and
    where a first cutting tool is configured at one end of the angled edge and a second cutting tool is configured at the opposite end of the angled edge for use in producing an impact force used to machine a bladed disc for use in a turbine engine using non-rotational controlled fracturing processes.

2. A cutting tool assembly as in claim 1, where an upper portion of the tool holder is narrower in diameter than a lower portion of the tool holder.

3. A cutting tool assembly for use in controlled fracture machining comprising:
    a body having a rectilinear shape with a top end and bottom end;
    a tool holder attached to the bottom end of the body using an attachment wedge, and where the tool holder includes a first slanted edge and second slanted edge both connecting to an angled edge, where the angled edge extends below the first slanted edge and second slanted edge and forms a curved shape;
    a first cutting tool is configured at one end of the angled edge to operate in a forward direction of movement and a second cutting tool is configured at the opposite end of the angled edge to operate in a reverse direction of movement; and
    wherein an upper portion of the tool holder has a first diameter and the lower portion of the tool holder has a second diameter for use in producing and impact force used to machine a bladed disc for use in a turbine engine using controlled fracturing processes.

4. A cutting tool assembly as in claim 3, where the first diameter is smaller than the second diameter.

5. A cutting tool assembly for use in controlled fracture machining to produce a bladed disc comprising:
    a body;
    a trapezoidal shaped tool holder attached to one end of the body that includes a first slanted edge and second slanted edge connecting an angled edge that extends below the first slanted edge and second slanted edge where the angled edge forms a curved shape;
    a first cutting tool and second cutting tool configured on opposite sides of the angled edge for use in moving in forward and reverse directions to produce a controlled fracturing, non-rotational impact force with workpiece material used to machine the bladed disc; and
    wherein the first cutting tool and second cutting tool are configured to move at a rate of motion of at least 1200 inches/minute such that workpiece material forming the bladed disc is micro-cracked using non-rotational controlled fracturing processes allowing the cutting tool to shear the workpiece material into a precision shape.

6. A cutting tool assembly as in claim 5, wherein the curved shape extends inwardly toward the body.

* * * * *